(12) United States Patent
Hasegawa

(10) Patent No.: US 11,848,700 B2
(45) Date of Patent: Dec. 19, 2023

(54) COMMUNICATION DEVICE, COMMUNICATION CONTROLLING METHOD, AND NON-TRANSITORY COMPUTER-READABLE MEDIA

(71) Applicant: NEC Corporation, Tokyo (JP)

(72) Inventor: Yohei Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/910,091

(22) PCT Filed: Mar. 27, 2020

(86) PCT No.: PCT/JP2020/014402
§ 371 (c)(1),
(2) Date: Sep. 8, 2022

(87) PCT Pub. No.: WO2021/192314
PCT Pub. Date: Sep. 30, 2021

(65) Prior Publication Data
US 2023/0098774 A1 Mar. 30, 2023

(51) Int. Cl.
*H04B 10/079* (2013.01)
*H04B 10/29* (2013.01)

(52) U.S. Cl.
CPC ......... *H04B 10/0795* (2013.01); *H04B 10/29* (2013.01)

(58) Field of Classification Search
CPC ............................ H04B 10/0795; H04B 10/29
USPC ...................................................... 398/25
See application file for complete search history.

(56) References Cited

U.S. PATENT DOCUMENTS

| 8,036,121 B2 * | 10/2011 | Kobayashi .............. H04L 43/00 370/242 |
| 2008/0056196 A1 | 3/2008 | Ito et al. |
| 2008/0193125 A1 * | 8/2008 | Weber .............. H04B 10/07953 398/25 |

(Continued)

FOREIGN PATENT DOCUMENTS

| JP | 2008-066765 A | 3/2008 |
| JP | 2014-103555 A | 6/2014 |

(Continued)

OTHER PUBLICATIONS

Hasegawa et al; A Transmission Control Protocol for Free-Space Optical Communications ; 2017; IEEE; pp. 1-7. (Year: 2017).*

(Continued)

*Primary Examiner* — Amritbir K Sandhu
(74) *Attorney, Agent, or Firm* — Sughrue Mion, PLLC

(57) ABSTRACT

Provided are a communication device, a communication controlling method, and a non-transitory computer-readable medium storing a communication controlling program that each make it possible to grasp the condition of communication quality. A communication device (1) includes acquiring means (2) configured to acquire quality information concerning a burst error that has occurred in an optical communication line. The communication device (1) includes estimating means (3) configured to estimate a first index value based on the quality information acquired by the acquiring means (2), the first index value indicating a degree of influence of the burst error on communication quality in a first communication device.

12 Claims, 9 Drawing Sheets

(56) References Cited

U.S. PATENT DOCUMENTS

| | | | | |
|---|---|---|---|---|
| 2014/0141823 | A1* | 5/2014 | Kozakaya | G06T 7/0002 455/500 |
| 2018/0205495 | A1 | 7/2018 | Maeda et al. | |
| 2021/0243100 | A1 | 8/2021 | Ishibashi et al. | |
| 2022/0329319 | A1* | 10/2022 | Hasegawa | H04L 65/40 |
| 2023/0098774 | A1* | 3/2023 | Hasegawa | H04B 10/29 398/25 |

FOREIGN PATENT DOCUMENTS

| | | |
|---|---|---|
| JP | 2016-046770 A | 4/2016 |
| JP | 2018-116344 A | 7/2018 |
| JP | 2019-193082 A | 10/2019 |
| WO | 2018/155406 A1 | 8/2018 |

OTHER PUBLICATIONS

Nguyen et al; TCP Performance Over Satellite-Based Hybrid FSO/RF Vehicular Networks: Modeling and Analysis; Aug. 2021; IEEE Access; pp. 1-15. (Year: 2021).*

International Search Report for PCT Application No. PCT/JP2020/014402, dated Jul. 7, 2020.

Jesse E. Simsarian et al., "Error Awareness in a Multi-Layer Transport Network Operating System", Journal of Optical Communications and Networking, vol. 10, No. 3, Mar. 2018, pp. 152-161.

Yohei Hasegawa et al., "A Transmission Control Protocol for Long Distance High-Speed Wireless Communications", IEICE Transactions on Communications, vol. EI0I-B. No. 4, Apr. 2018, pp. 1045-1054.

Neal Cardwell et al. "BBR: Congestion-Based Congestion Control", ACM Queue, vol. 14, Issue 5, Dec. 2016, pp. 20-53.

Yohei Hasegawa, "A Transmission Control Protocol for Free-Space Optical Communications", 2017 IEEE Global Communications Conference, Jan. 15, 2018, pp. 1-7, ISBN 978-1-5090-5019-2.

Yohei Hasegawa et al., "A Throughput Model of TCP-FSO/ADFR for Free Space Optical Satellite Communications", 2019 IEEE Global Communications Conference, Feb. 27, 2020, pp. 1-6, ISBN 978-1-7281-0962-6.

JP Office Action for JP Application No. 2022-509211, dated May 2, 2023 with English Translation.

* cited by examiner

COMMUNICATION DEVICE, COMMUNICATION CONTROLLING METHOD, AND NON-TRANSITORY COMPUTER-READABLE MEDIA

This application is a National Stage Entry of PCT/JP2020/014402 filed on Mar. 27, 2020, the contents of all of which are incorporated herein by reference, in their entirety.

TECHNICAL FIELD

The present disclosure relates to communication devices, communication controlling methods, and non-transitory computer-readable media.

BACKGROUND ART

As described in Patent Literature 1, a burst error may occur in communication carried out between two communication devices via a transmission line. Patent Literature 1 discloses a technique of reproducing a burst error that has occurred in a transmission line.

There is known an optical communication system that communicates via an optical communication line. In this optical communication system, generally a powerful error correction process is performed, and as compared to a land-based communication system, the optical communication system provides its end users with so-called error-free communication in which the error rate of transmitted or received data is extremely low.

CITATION LIST

Patent Literature

Patent Literature 1: Japanese Unexamined Patent Application Publication No. 2018-116344

Non Patent Literature

Non Patent Literature 1: Jesse E. Simsarian, Young-Jin Kim, Nakjung Choi, Catello Di Martino, Nishok N. Mohanasamy, Peter J. Winzer, and Marina Thottan. "Error Awareness in a Multi-Layer Transport Network Operating System," Journal of Optical Communications and Networking, Vol. 10, Issue 3, February 2018.
Non Patent Literature 2: Yohei Hasegawa and Jiro Katto. "A Transmission Control Protocol for Long Distance High-Speed Wireless Communications," IEICE Trans. on Communication, Vol. E101-B, No. 4, April 2018.
Non Patent Literature 3: Neal Cardwell, Yuchung Cheng, C. Stephen Gunn, Soheil Hassas Yeganeh, and Van Jacobson. "BBR: Congestion-Based Congestion Control," ACM Queue, Vol. 14, Issue 5, December 2016.

SUMMARY OF INVENTION

Technical Problem

In an optical communication system, for example, a large margin is set to a communication setting, such as a necessary signal-to-noise ratio (SNR) or an error correction process, in order to provide its end users with error-free communication and a stable long-lasting service.

In recent years, communication service providers that manage communication facilities and communication lines (communication infrastructure) in optical communication systems have diversified. Some communication service providers may be inclined to secure communication capacity of communication infrastructure by setting the acceptable communication quality in optical communication systems lower than the communication quality in error-free communication. The diversification of communication service providers in the field of optical communication systems has made it necessary to take into consideration not only the communication quality but also the communication capacity of communication infrastructure. Hence, in one possible scenario, a communication service provider may run an optical communication system in which, for example, a low margin is set to a communication setting in order to increase the communication capacity. However, if a change is made to a margin set to a communication setting, this makes it difficult to grasp the condition of communication quality provided to the users, and this situation may make it impossible for the communication service provider to grasp the condition of communication quality appropriately.

To address the circumstances above, one object of the present disclosure is to provide a communication device, a communication controlling method, and a non-transitory computer-readable medium that each make it possible to grasp the condition of communication quality.

Solution to Problem

A communication device according to the present disclosure includes:
acquiring means configured to acquire quality information concerning a burst error that has occurred in an optical communication line; and
estimating means configured to estimate a first index value based on the quality information, the first index value indicating a degree of influence of the burst error on communication quality in a first communication device.

A communication controlling method according to the present disclosure includes:
acquiring quality information concerning a burst error that has occurred in an optical communication line; and
estimating a first index value based on the quality information, the first index value indicating a degree of influence of the burst error on communication quality in a first communication device.

A non-transitory computer-readable medium according to the present disclosure stores a communication controlling program that causes a computer to execute:
acquiring quality information concerning a burst error that has occurred in an optical communication line; and
estimating a first index value based on the quality information, the first index value indicating a degree of influence of the burst error on communication quality in a first communication device.

Advantageous Effects of Invention

The present disclosure can provide a communication device, a communication controlling method, and a non-transitory computer-readable medium that each make it possible to grasp the condition of communication quality.

EXAMPLE EMBODIMENT

Figure 1:
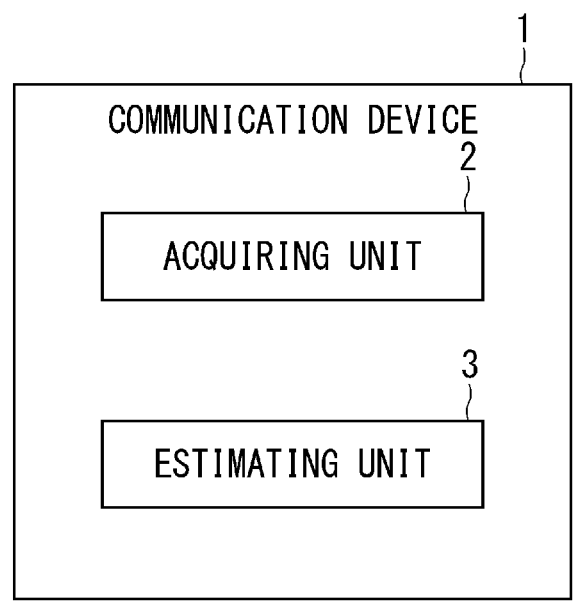
FIG. 1 is a block diagram illustrating an example of a configuration of a communication device according to an overview of some example embodiments.

Hereinafter, some example embodiments of the present disclosure will be described with reference to the drawings. In the following description and drawings, omissions and simplifications are made, as appropriate, to make the description clearer. In the drawings, identical elements are given identical reference characters, and their repetitive description will be omitted, as necessary.

Examinations Leading to Example Embodiments

As described above, with the diversification of service providers providing communication infrastructure, some communication service providers may hope to increase communication capacity in optical communication systems. In one possible scenario, such a communication service provider may increase communication capacity by, for example, reducing a margin set to a communication setting, such as necessary SNR or an error correction process (forward error correction (FEC)).

Non Patent Literature 1 indicates that reducing a margin set to a communication setting causes a non-frequent burst error. Such a burst error is a post-FEC burst error. Non Patent Literature 1 discloses a relationship between, for example, a quality value such as SN ratio and a Post-FEC bit error rate (BER) in an optical communication and indicates that a burst error occurs non-frequently when the quality value has become worse than a predetermined value. Meanwhile, a communication service provider that wants to increase communication capacity may achieve this by increasing communication channels to increase communication capacity, but an increase in communication channels may cause a burst error. Moreover, a burst error may occur in response to a change in the voltage at a communication line caused by, for example, lightning, an earthquake, or the like.

In this manner, communication capacity can be increased by reducing a communication setting margin, a margin set to a communication setting. However, such reduction causes a burst error non-frequently, and thus a communication setting margin needs adjusting with a grasp of the condition of communication quality including the degree of influence of a burst error on users. Accordingly, the inventor has found that a communication service provider can grasp the condition of communication quality by estimating an index value indicating the degree of influence, on users, of a burst error that occurs when a communication setting margin has been changed.

Overview of Example Embodiments

FIG. 1 is a block diagram illustrating an example of a configuration of a communication device according to an overview of some example embodiments. A communication device 1 partly constitutes an optical communication system and may be, for example, an optical transmission device or a network monitoring device that monitors and controls the optical communication system. The communication device 1 includes an acquiring unit 2 and an estimating unit 3.

The acquiring unit 2 acquires quality information concerning a burst error that has occurred in an optical communication line. The optical communication line is, for example, a submarine cable. The quality information may include a communication round-trip time between optical transmission devices connected to an optical communication line 16 and a burst error time of a burst error. The communication round-trip time may be a round-trip time (RTT). Herein, a plurality of pieces of data are transmitted from an optical transmission device 20 to an optical transmission device 30, and thus the communication round-trip time may be an average of RTTs between the optical transmission devices connected to the optical communication line 16. The quality information may include a first error rate in the optical communication line. The first error rate may be BER or a frame error rate (FER).

Based on the quality information acquired by the acquiring unit 2, the estimating unit 3 estimates a first index value indicating the degree of influence of a burst error on the communication quality in a first communication device. The first communication device may be an end user terminal managed by an end user or a relay device between an end user terminal and an optical transmission device.

The communication device 1, configured as described above, estimates the first index value, which indicates the degree of influence of a burst error on the communication quality in the first communication device, based on the quality information concerning the burst error. A communication service provider that operates the optical communication system can grasp the condition of communication quality based on the first index value. Accordingly, the communication device 1 according to an example embodiment makes it possible to grasp the condition of communication quality by estimating the first index value.

First Example Embodiment

Hereinafter, a first example embodiment will be described with reference to the drawings.

<Example of Configuration of Optical Communication System>

Figure 2:
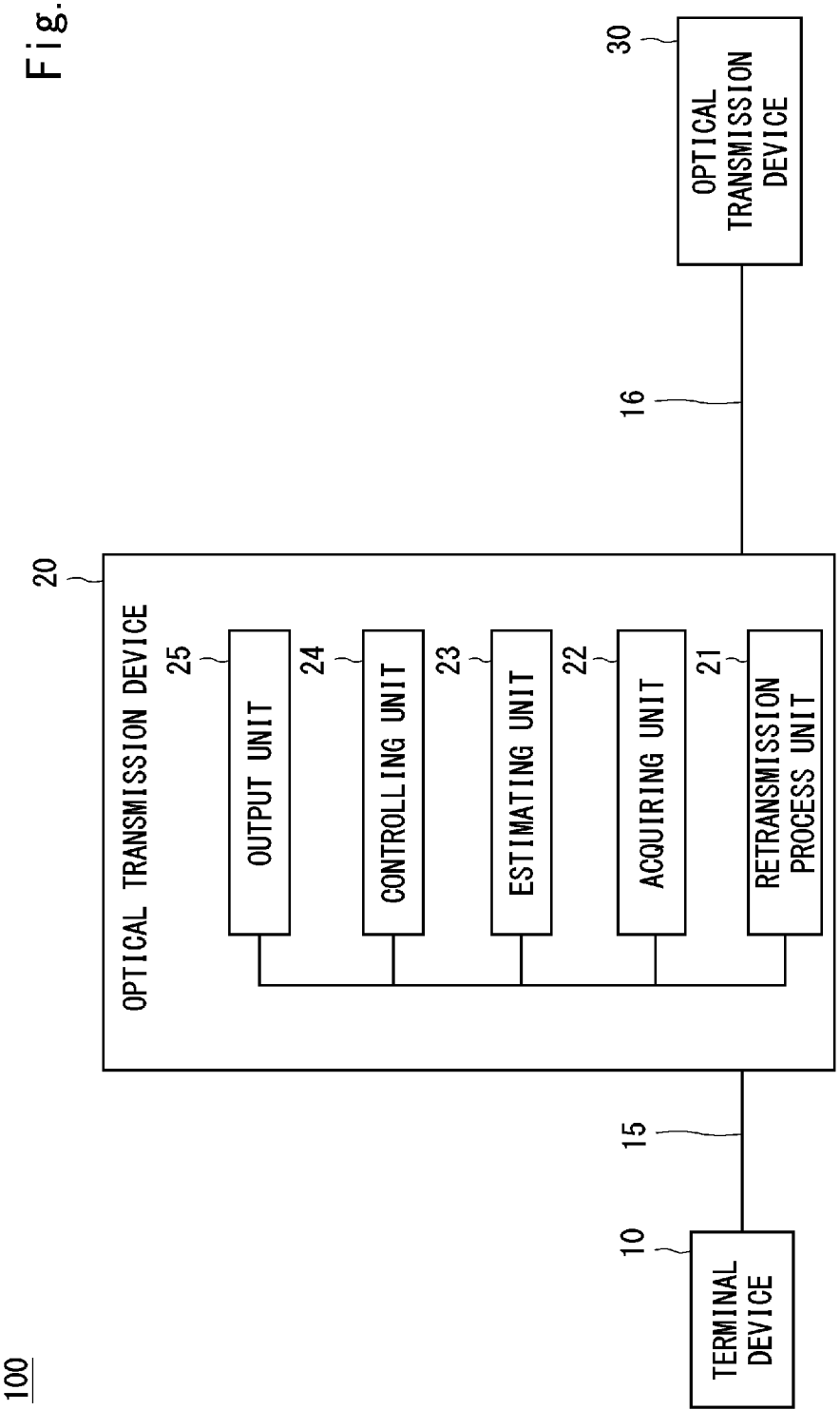
FIG. 2 illustrates an example of a configuration of an optical communication system according to a first example embodiment.

With reference to FIG. 2, an example of a configuration of an optical communication system 100 according to the first example embodiment will be described. FIG. 2 illustrates an example of a configuration of an optical communication system according to the first example embodiment. The optical communication system 100 includes a terminal device 10 and optical transmission devices 20 and 30.

The terminal device 10 is, for example, a communication device provided on land. The terminal device 10 may be, for example but not limited to, an end user terminal managed by an end user or a relay device provided between an end user terminal and the optical transmission device 20. In the following description, the terminal device 10 is an end user terminal.

The terminal device 10 is connected to the optical transmission device 20 via a circuit 15 and communicates with the optical transmission device 20 via the circuit 15. The circuit 15 is, for example, an access circuit. The circuit 15 may be referred to as a communication line between the terminal device 10 and the optical transmission device 20.

The optical transmission devices 20 and 30 are communication devices that are connected to and communicate with each other via an optical communication line 16, which is a submarine cable constituted, for example, by optical fibers. The optical transmission devices 20 and 30 each convert an optical signal transmitted or received via the optical communication line 16 to an electric signal to be transmitted or received via the circuit 15 or a circuit (not illustrated) connected to the optical transmission device 30. Moreover, the optical transmission devices 20 and 30 each convert an electric signal transmitted or received via the circuit 15 or a circuit (not illustrated) connected to the optical transmission device 30 to an optical signal to be transmitted or received via the optical communication line 16.

The optical transmission devices 20 and 30 support a wavelength division multiplexing (WDM) scheme and each transmit data to be transmitted or received via the optical communication line 16 to the opposing optical transmission device via a plurality of communication channels of a plurality of wavelength bands. Each communication channel may be referred to as an optical spectrum.

The optical transmission device 20 and the optical transmission device 30 communicate via a TCP scheme having higher error resistance than a typical TCP Reno scheme. The optical transmission device 20 and the optical transmission device 30 execute a retransmission process via a TCP scheme having higher error resistance than a typical TCP Reno scheme, if an error has occurred in communication in the optical communication line 16.

Non Patent Literatures 2 and 3 propose a TCP scheme having higher error resistance than a TCP Reno scheme, which is a typical transmission control protocol (TCP) scheme, and capable of achieving high-speed communication. Non Patent Literature 2 proposes, as a TCP scheme having high error resistance and capable of achieving high-speed communication, a transmission control protocol-free-space optical communications (TCP-FSO) scheme that is capable of achieving a data transmission throughput of higher than 10 Gbps. Non Patent Literature 3 as well proposes a TCP scheme having higher error resistance than a typical TCP scheme. The TCP schemes disclosed in Non Patent Literatures 2 and 3 may be referred to as an ultra-high-speed TCP scheme since these schemes are capable of achieving high data transmission throughput.

Figure 3:
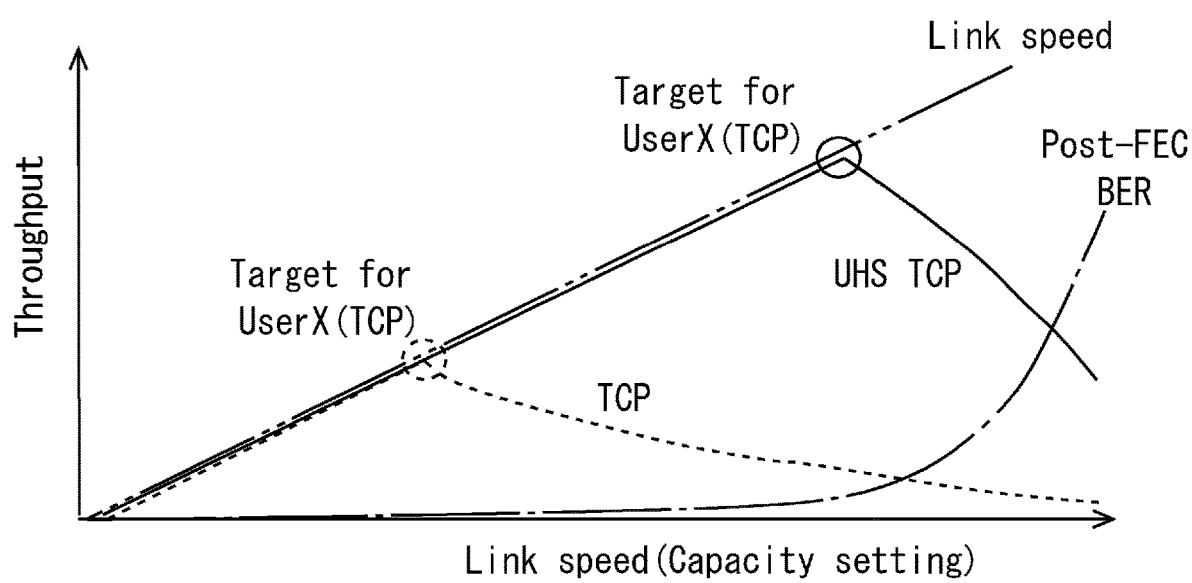
FIG. 3 is a diagram comparing a typical TCP scheme and ultra-high-speed TCP.

FIG. 3 is a diagram comparing a typical TCP scheme and ultra-high-speed TCP. The horizontal axis in FIG. 3 indicates a link speed and corresponds to communication capacity. The vertical axis indicates user throughput. The dashed-dotted line shows Post-FEC BER. The dotted line shows a relationship between the throughput and communication capacity of the typical TCP scheme. The solid line shows a relationship between the user throughput and communication capacity of the ultra-high-speed TCP scheme disclosed in Non Patent Literatures 2 and 3.

The section circled by a dotted line in FIG. 3 shows the best user throughput in the typical TCP scheme. The section circled by a solid line in FIG. 3 shows the best user throughput in the ultra-high-speed TCP scheme. As illustrated in FIG. 3, the communication capacity held when the user throughput is at its best is greater in the ultra-high-speed TCP scheme than in the typical TCP scheme. Moreover, the user throughput does not fall even with an increase in Post-FEC BER in the ultra-high-speed TCP scheme, and the communication capacity can be ensured while increasing the user throughput until it reaches the section circled by the solid line. In this manner, the ultra-high-speed TCP scheme disclosed in Non Patent Literatures 2 and 3 can increase the user throughput and communication capacity than the TCP Reno scheme, the typical TCP scheme, even with a rise in Post-FEC BER. Therefore, the optical transmission devices 20 and 30 execute a retransmission process by use of the TCP scheme disclosed in Non Patent Literatures 2 and 3 and having higher error resistance than the typical TCP Reno scheme. This configuration allows the optical transmission devices 20 and 30 to increase communication capacity of the optical communication line 16.

The description continues with reference back to FIG. 2. In response to properly receiving data transmitted or received via the optical communication line 16, the optical transmission devices 20 and 30 each transmit acknowledgement (ACK) to its opposing optical transmission device. If the optical transmission devices 20 and 30 fail to receive acknowledgement for data transmitted or received via the optical communication line 16, the optical transmission devices 20 and 30 retransmit the data for which they have failed to receive acknowledgement.

The optical transmission device 20 corresponds to the communication device 1. The optical transmission device 20 transmits data transmitted from the terminal device 10 to a terminal device (not illustrated) opposing the terminal device 10 via the optical communication line 16 and the optical transmission device 30. The optical transmission device 20 receives data transmitted to the terminal device 10 and transmits the received data to the terminal device 10.

The optical transmission device 30 transmits data transmitted from a terminal device (not illustrated) opposing the terminal device 10 to the terminal device 10 via the optical communication line 16 and the optical transmission device 20. The optical transmission device 30 receives data transmitted to a terminal device (not illustrated) opposing the terminal device 10 and transmits the data to the terminal device (not illustrated) opposing the terminal device 10.

<Example of Configuration of Optical Transmission Device>

Next, an example of a configuration of the optical transmission device 20 will be described. The optical transmission device 20 includes a retransmission process unit 21, an acquiring unit 22, an estimating unit 23, a controlling unit 24, and an output unit 25.

The retransmission process unit 21 executes a retransmission process if an error occurs in communication in the optical communication line 16. The retransmission process unit 21 executes a retransmission process by communicating via an ultra-high-speed TCP scheme having higher error resistance than a typical TCP Reno scheme.

The retransmission process unit 21 transmits data to the optical transmission device 30 via the optical communication line 16. The retransmission process unit 21 receives acknowledgement (ACK) for this data from the optical transmission device 30. In response to receiving the acknowledgement (ACK), the retransmission process unit 21 transmits another piece of data following the aforementioned data. Meanwhile, if the retransmission process unit 21 receives no acknowledgement (ACK), the retransmission process unit 21 retransmits the data for which the retransmission process unit 21 has received no acknowledgement. The retransmission process unit 21 receives data from the optical transmission device 30 via the optical communication line 16. If the retransmission process unit 21 has received this data properly, the retransmission process unit 21 transmits ACK to the optical transmission device 30.

The acquiring unit 22 includes, for example, an optical spectrum measuring device, such as an optical channel monitor (OCM) or an optical spectrum analyzer. The acquiring unit 22 acquires quality information concerning a burst error that occurs in communication in the optical communication line 16. The quality information includes RTT indicating a communication round-trip time between the optical transmission devices 20 and 30 connected to the optical communication line 16, a burst error time in which a burst error has occurred, and an error rate in the optical communication line 16.

The quality information may further include the number of users who communicate via the optical communication line 16 and SNR indicating an optical signal quality in the optical communication line 16. The optical signal quality may be an optical signal-to-noise ratio (OSNR).

The error rate may be BER or FER. Herein, a Post-FEC burst error is expected to occur non-frequently, and thus BER and FER are expected to have substantially the same value. Therefore, the acquiring unit 22 may acquire BER or FER. A variable representing the error rate in the optical communication line 16 is defined as P. In the present example embodiment described herein, the error rate is BER.

Figure 4:
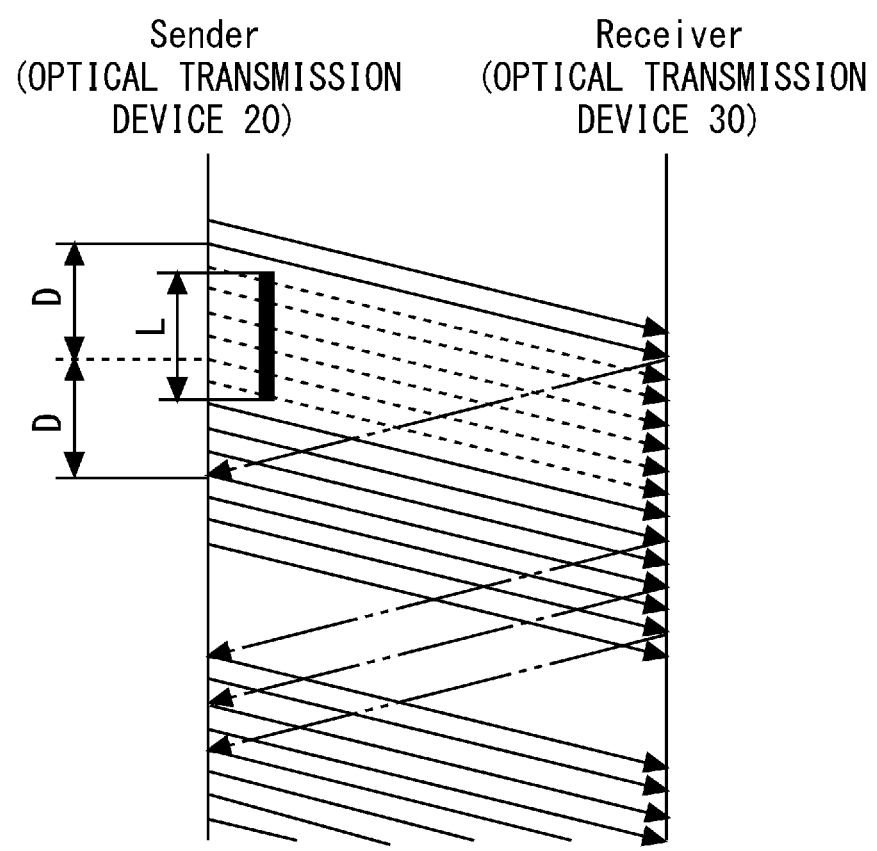
FIG. 4 illustrates a condition of data transmission and reception between optical transmission devices.

Now, RTT and the burst error time will be described with reference to FIG. 4. FIG. 4 illustrates a condition of data transmission and reception between the optical transmission devices. The solid lines and the dotted lines show data transmitted from the optical transmission device 20 on the data transmitting end to the optical transmission device 30 on the data receiving end. The solid lines show data transmitted from the optical transmission device 20 and received properly by the optical transmission device 30. The dotted lines show data transmitted from the optical transmission device 20 and having failed to be received properly by the optical transmission device 30. The dashed-three-dotted lines each show acknowledgement sent from the optical transmission device 30. Herein, the optical transmission device 30 also serves as a device on the transmitting end, and the optical transmission device 20 also serves as a device on the receiving end.

RTT is the length of time between the transmission time when data is transmitted from the optical transmission device 20 to the optical transmission device 30 and the reception time when acknowledgement for this data is received by the optical transmission device 20. When the length of time from the transmission of data by the optical transmission device 20 to the arrival of this data at the optical transmission device 30 is defined as D, RTT can be expressed by 2 D. The acquiring unit 22 monitors data transmitted to the optical transmission device 30 and acquires RTT based on the length of time from the transmission time of the data to the reception time of acknowledgement for this data.

Herein, the acquiring unit 22 may hold position information corresponding to the IP addresses of the optical transmission devices 20 and 30, identify the positions of the optical transmission devices 20 and 30 based on the IP addresses in data transmitted from the optical transmission device 20 to the optical transmission device 30, and determine RTT by calculating the distance between the positions.

A burst error time is the duration of a burst error that has occurred within an RTT, and a variable representing a burst error time is defined as L. A plurality of burst errors can occur within an RTT, and thus a burst error time is the total duration of a plurality of burst errors that have occurred within an RTT. In FIG. 3, a series of dotted lines appear in the section indicated by the rectangle, and this indicates that burst errors have occurred. The acquiring unit 22 acquires, as a burst error time, the total length of time in which a series of data transmitted to the optical transmission device 30 has failed to be received properly. Since a plurality of pieces of data are transmitted from the optical transmission device 20 to the optical transmission device 30, the burst error time is an average of the total duration of burst errors with respect to the plurality of pieces of data.

The estimating unit 23 estimates an index value indicating the degree of influence of a burst error on communication quality in the terminal device 10, based on quality information acquired by the acquiring unit 22. The index value includes a user proportion indicating the proportion of the number of users for whom the communication quality deteriorates with respect to the number of users who communicate via the optical communication line 16, a delay time in the terminal device 10, and the probability of failing to satisfy a delay quality index value pertaining to a delay time required for communication in an optical communication line.

The user proportion can also be explained as the proportion of the number of users for whom the delay time deteriorates due to a retransmission process with respect to the number of users who communicate via the optical communication line 16. A user for whom the delay time deteriorates due to a retransmission process cannot use the communication circuit during the retransmission process, and thus the user proportion can also be explained as the proportion of users who are unable to use the communication circuit in a certain period of time.

The terminal device 10 is an end user terminal according to the present example embodiment, and thus a delay time in the terminal device 10 is a delay time at an end user and may be referred to as a user delay time. The delay quality index value is an index value pertaining to a delay time that a communication service provider managing the optical communication line 16 requires for communication in the optical communication system. The probability of failing to satisfy the delay quality index value can also be stated as the probability of failing to maintain communication quality and may thus be referred to as the probability of quality deterioration. Herein, the estimating unit 23 estimates the index value described above with an assumption that noise in the optical communication line 16 is additive white Gaussian noise (AWGN).

The estimating unit 23 estimates the user proportion based on RTT and a burst error time acquired by the acquiring unit 22. Herein, when a variable representing the user proportion is defined as A, the user proportion can be calculated through the following equation (1). Therefore, the estimating unit 23 estimates the user proportion by use of the equation (1).

[Math. 1]

$$A = L/D$$

$$\text{If } A < A' \tag{1}$$

In the above, A is the user proportion, L is a burst error time, D is half the duration of RTT, and A' is a target threshold. While D in the equation (1) is half the duration of RTT, the variable D may be replaced by RTT.

Whereas a typical error rate is expressed by the number of errors/the number of pieces of communication data, the above user proportion is the probability with which user communication is carried out during a burst error. For example, if an average burst error time L is 10 ms and a communication round-trip time D is 30 ms, A turns out to be 10 ms/30 ms=⅓, which is high relative to a typical error rate. In this manner, the estimating unit 23 can detect an influence of a burst error with high sensitivity by obtaining the variable A indicating the user proportion by use of the above equation (1). In other words, since the estimating unit 23 calculates the degree of influence of a burst error with high sensitivity, the use of the user proportion calculated through the above equation (1) makes it possible to provide users with a stable communication service.

The estimating unit 23 estimates a delay time in the terminal device 10 based on RTT and BER acquired by the acquiring unit 22. In other words, the estimating unit 23 estimates a user delay time based on RTT and BER. Herein, when a variable representing the delay time in the terminal device 10 is defined as $D_{user}$, the delay time in the terminal device 10 can be calculated through the following equation (2). The estimating unit 23 estimates a delay time in the terminal device 10 by use of the equation (2).

[Math. 2]

$$D_{user} = D + \sum_{i=1}^{\infty} DP^i(1-P) \quad (2)$$

If $D_{user} < D'$

In the above, $D_{user}$ is the delay time in the terminal device 10, D is half the duration of RTT, P is BER in the optical communication line 16, and D' is a target threshold. While the variable D in the equation (2) is a variable indicating half the duration of RTT, the variable D may be replaced by RTT.

In the above equation (2), i represents the number of instances of retransmission process, and the second term on the right-hand side represents a delay time with a retransmission process taken into consideration. The estimating unit 23 estimates a delay time in the terminal device 10 with a retransmission process taken into consideration.

The estimating unit 23 estimates the probability of failing to satisfy the delay quality index value in the terminal device 10 based on RTT, BER, and the delay quality index value acquired by the acquiring unit 22. In other words, the estimating unit 23 estimates the probability of quality deterioration based on RTT, BER, and the delay quality index value.

Herein, when a variable representing the probability of failing to satisfy the delay quality index value is defined as $P_{DF}$, the probability of failing to satisfy the delay quality index value can be calculated through the following equation (3). The estimating unit 23 estimates the probability of failing to satisfy the delay quality index value by use of the equation (3).

[Math. 3]

$$P_{DF} = P^{(n+1)} \quad \left(n = \frac{D_{SLA}}{D} \geq 2\right) \quad (3)$$

If $P_{DF} < P'$

In the above, $P_{DF}$ is the probability of failing to satisfy the delay quality index value, D is half the duration of RTT, P is BER in the optical communication line 16, $D_{SLA}$ is the delay quality index value, and P' is a target threshold. While the variable D in the equation (3) is a variable indicating half the duration of RTT, the variable D may be replaced by RTT.

In the equation (3), n represents the number of instances of retransmission in retransmission process executed in the optical communication line 16, and this number is determined based on the delay quality index value. If a retransmission process is executed n times based on the delay quality index value $D_{SLA}$, $P_{DF}$ can be stated as the probability of quality deterioration with which communication quality will no longer be maintained. As described above, since $P_{DF} = P^{(n+1)}$, the probability of quality deterioration is very low, and an influence on the average delay time is also small. In other words, a communication service provider can operate the optical communication system with a smaller margin by use of the above equation (3). In other words, even though the error rate is not eliminated, a communication service provider can operate the optical communication system with increased communication capacity.

The controlling unit 24 changes a communication setting in the optical communication line 16 by use of the user proportion estimated by the estimating unit 23. The controlling unit 24, by use of the user proportion estimated by the estimating unit 23, changes the modulation scheme in communication in the optical communication line 16 and adjusts a communication setting margin.

Moreover, the controlling unit 24 may, by further use of the number of users who communicate via the optical communication line 16 and SNR indicating the optical signal quality, change the modulation scheme in communication in the optical communication line 16 and adjust a communication setting margin.

A plurality of modulation schemes can be used in communication in the optical communication line 16. Examples of such modulation schemes used in communication in the optical communication line 16 include Binary Phase shift Keying (BPSK), Quadrature Phase shift Keying (QPSK), 8-Quadrature Amplitude Modulation (QAM), 16-QAM, 32-QAM, 64-QAM, 128-QAM, or 256-QAM.

In short-duration communication, the communication speed (throughput) decreases for user communication that has experienced a burst error due to a retransmission process, and thus the utilization rate of the communication circuit may decrease during a burst error. The controlling unit 24, taking the user proportion into consideration, adjusts a communication setting margin so that the total $B_{EST}$ of the communication speed of users for whom no retransmission process is performed momentarily does not fall far below the circuit speed $B_{MOD}$ of the optical communication line 16.

Herein, when the number of users who communicate via the optical communication line 16 is represented by U and the user communication speed is represented by $B_{TCP}$, $B_{EST}$ can be expressed as in the equation (4). The controlling unit 24 calculates $B_{EST}$ by use of the equation (4). Herein, the variable A represents the user proportion estimated by the estimating unit 23, and the variable U represents the number of users acquired by the acquiring unit 22.

[Math. 4]

$$B_{EST} = (1-A) \times U \times B_{TCP} \quad (4)$$

An ultra-high-speed TCP scheme is adopted in the optical transmission devices 20 and 30, and the user communication speed $B_{TCP}$ can be expressed as in the following equation (5).

[Math. 5]

$$B_{TCP} = \frac{W}{D\log(W)}\log\left(\frac{1}{P}\right) \quad (5)$$

In the above, D is a communication round-trip time, W is a buffer size of a buffer that temporarily holds data for performing communication of a TCP scheme, and P is BER. The variable W can be acquired in advance by the controlling unit 24 from its host device.

Herein, if a typical TCP scheme is adopted in the optical transmission devices 20 and 30, the user communication speed $B_{TCP}$ can be expressed as in the following.

[Math. 6]

$$B_{TCP} = \frac{V}{D\sqrt{P}}$$

In the above, D is a communication round-trip time, P is BER, and V is a constant. Herein, the constant V is, for example, 0.866.

A communication setting margin can be changed by changing the multi-value level of a multi-level modulation scheme, where the multi-value level indicates the number of states allowing transmission in one communication symbol. When a variable representing the multi-value level is M, a variable representing the communication speed in a multi-level modulation scheme is $B_{MOD}$, and a variable representing the communication speed of BPSK, which is a modulation scheme indicating two states with one symbol, is $B_B$, $B_{MOD}$ can be expressed as in the following equation (6). Herein, the variable M representing the multi-value level can be from 4 to 4096. The controlling unit 24 can achieve the above by setting the variable $B_B$ in advance. The controlling unit 24 determines the modulation scheme based on the variable M representing the multi-value level and can thus hold the variable M representing the multi-value level, which will be described later.

[Math. 7]

$$B_{MOD} = \log_2 M \times B_B \quad (6)$$

Figure 5:
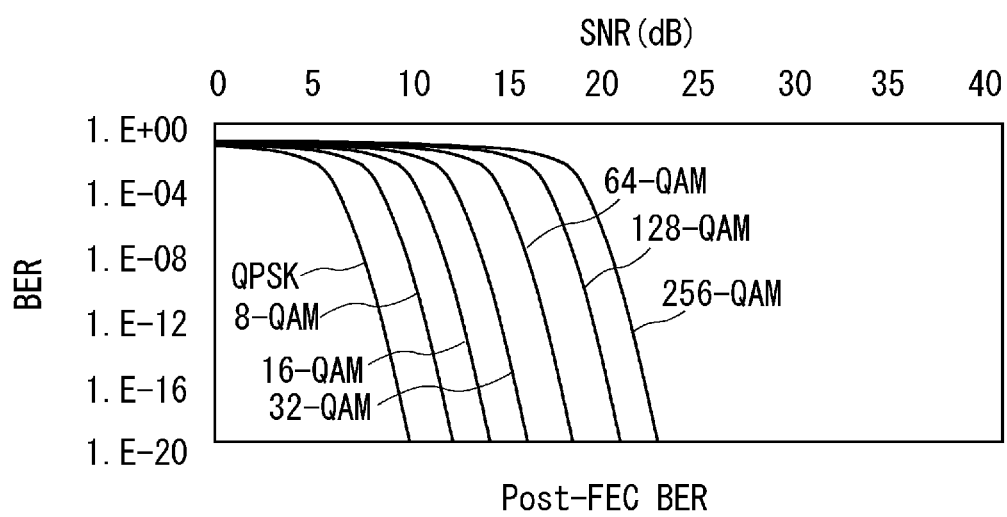
FIG. 5 illustrates a relationship between an error rate and SNR in a plurality of modulation schemes.

Now, a relationship between Post-FEC BER and SNR in a plurality of modulation schemes will be described with reference to FIG. 5. FIG. 5 illustrates a relationship between an error rate and SNR in a plurality of modulation schemes. The horizontal axis in FIG. 5 indicates SNR, and the vertical axis indicates Post-FEC BER. As illustrated in FIG. 5, when Post-FEC BER is identical, higher SNR is required as the multi-value level of a modulation scheme is higher. In this manner, a higher multi-value level requires communication of higher SNR.

A variable $P_{MOD}$ representing the error rate in a modulation scheme with respect to the variable M representing the multi-value level can be expressed as in the following equation (7).

[Math. 8]

$$P_{MOD} = \frac{4}{k}\left(1 - \frac{1}{\sqrt{M}}\right) \times \frac{1}{2}\mathrm{erfc}\left(\sqrt{\frac{3k \times SNR}{M-1}}\right) \quad (7)$$

In the above, k is a symbol length of a communication signal, SNR is an optical signal quality in the optical communication line 16, and erfc is a complementary error function. Herein, the complementary error function erfc can be expressed by the following equation (8).

[Math. 9]

$$\mathrm{erfc}(x) = \frac{2}{\sqrt{2}}\int_x^\infty e^{-t^2}dt \quad (8)$$

When $B_{EST}$ is smaller than $B_{MOD}$, the controlling unit 24 determines a new multi-value level $M_{i+1}$ by lowering the multi-value level to lower than the current multi-value level $M_i$. In other words, the controlling unit 24 sets the multi-value level to $M_{i+1}=M_{i-1}$.

The controlling unit 24 changes the modulation scheme from a modulation scheme that can be used in communication in the optical communication line 16 described above to a modulation scheme corresponding to $M_{i+1}$. The controlling unit 24 changes a communication setting margin by changing the modulation scheme. By changing the modulation scheme, the controlling unit 24 achieves communication in which users are less likely to sense a decrease in communication quality.

Meanwhile, when at least one of a burst error time or $P_{MOD}$ is smaller than, for example, a target threshold, the controlling unit 24 determines a new multi-value level $M_{i+1}$ by raising the multi-value level to higher than the current multi-value level $M_i$. In other words, the controlling unit 24 sets the multi-value level to $M_{i+1}=M_{i+1}$.

The controlling unit 24 changes the modulation scheme from a modulation scheme that can be used in communication in the optical communication line 16 described above to a modulation scheme corresponding to $M_{i+1}$. The controlling unit 24 changes a communication setting margin by changing the modulation scheme. By changing the modulation scheme, the controlling unit 24 provides users with a high-speed communication service.

Herein, the controlling unit 24 may change a communication setting margin if the user proportion has exceeded a target threshold A' of the user proportion. For example, if the user proportion has exceeded A', the controlling unit 24 may change the modulation scheme to a modulation scheme corresponding to a multi-value level that is smaller than the current multi-value level by one. Meanwhile, if the user proportion is a sufficiently small value, such as 0.1, for example, the controlling unit 24 may change the modulation scheme to a modulation scheme corresponding to a multi-value level that is greater than the current multi-value level by one. The controlling unit 24 provides users with a high-speed communication service by changing the modulation scheme and adjusting a communication setting margin. In other words, the controlling unit 24 can provide users with a high-speed communication service even if BER of the optical communication line 16 has become higher than, for example, $10^{-12}$ with a communication setting margin that can cause a burst error.

Figure 6:
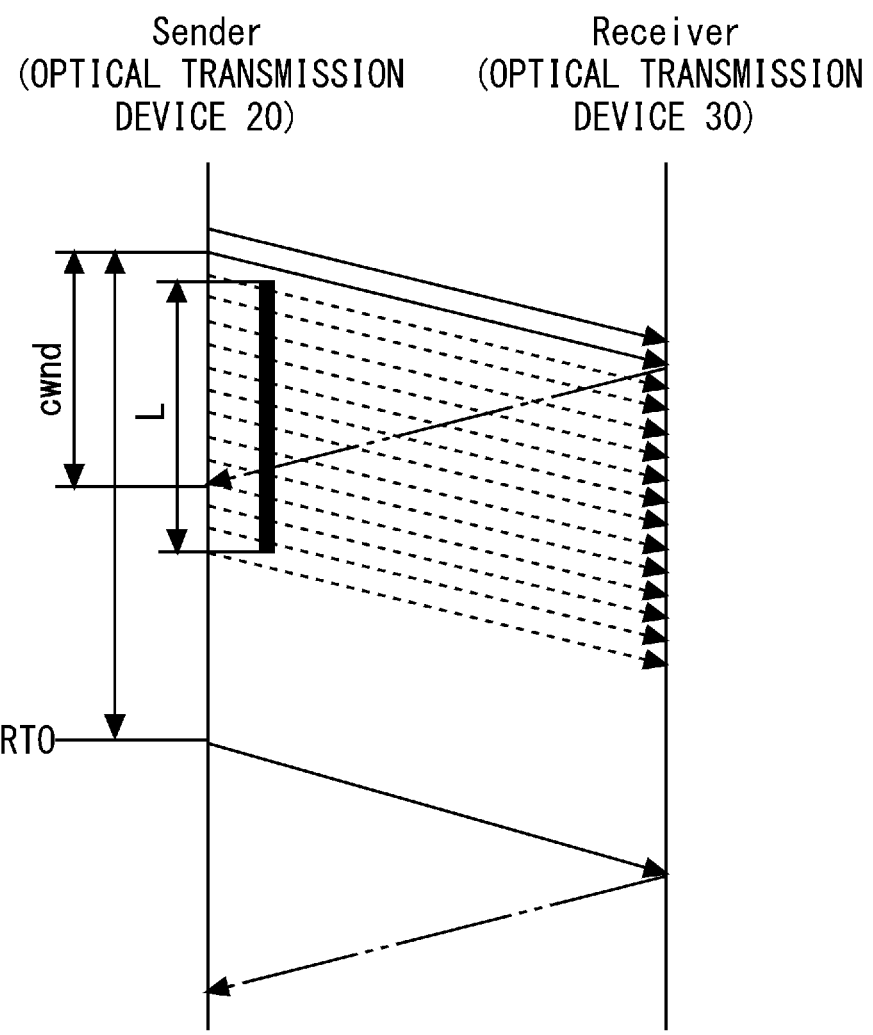
FIG. 6 illustrates a condition of communication of a TCP scheme.

The controlling unit 24 changes a communication setting so that a burst error time does not exceed RTT. FIG. 6 illustrates a condition of communication of a TCP scheme. FIG. 6 shows that the burst error time has exceeded the congestion window (cwnd) used in a TCP scheme.

In a TCP scheme, retransmission time out (RTO) is provided as a timer related to a retransmission process. As illustrated in FIG. 6, retransmission is carried out triggered by RTO upon the burst error time exceeding the congestion window. When retransmission triggered by RTO is carried out, a retransmission process is executed after a length of time corresponding to the RTO has passed from the data transmission start time. In other words, a retransmission process ceases to be performed until a length of time corresponding to the RTO passes from the data transmission start time. This case produces a duration in which no data is transmitted and limits the amount of data to be transmitted, and this leads to a large decrease in performance. Therefore, the controlling unit 24 performs control so that a burst error time does not exceed RTT. Specifically, the controlling unit 24 performs control so that a burst error time does not exceed RTT and keeps the throughput and communication capacity from decreasing by preventing retransmission triggered by RTO.

The controlling unit 24 changes an interleave length in an error correction process (FEC) so that a burst error time does not exceed RTT. Specifically, the controlling unit 24 performs control so that a burst error time does not exceed RTT by setting a short interleave in FEC. The controlling unit 24 can increase the user throughput and communication capacity by changing an FEC setting as in adjusting the interleave length.

The output unit 25 outputs an index value estimated by the estimating unit 23 and indicating the degree of influence of a burst error on communication quality in the terminal device 10. As described above, an index value includes the user proportion, a delay time in the terminal device 10, and the probability of failing to satisfy a delay quality index value. The output unit 25 outputs the user proportion, a delay time in the terminal device 10, and the probability of failing to satisfy a delay quality index value.

The output unit 25 may output the index value by transmitting the index value to a communication terminal used by a manager or an operator of the optical communication line 16. Alternatively, the output unit 25 may output the index value by transmitting the index value to a communication service provider managing the optical communication line 16. Alternatively, the output unit 25 may output the index value by transmitting the index value to a network monitoring device (not illustrated) that monitors the entire network in the optical communication system 100. Alternatively, the output unit 25 may output the index value to a display device included in the optical transmission device 20.

<Example of Operation of Optical Transmission Device>

Figure 7:
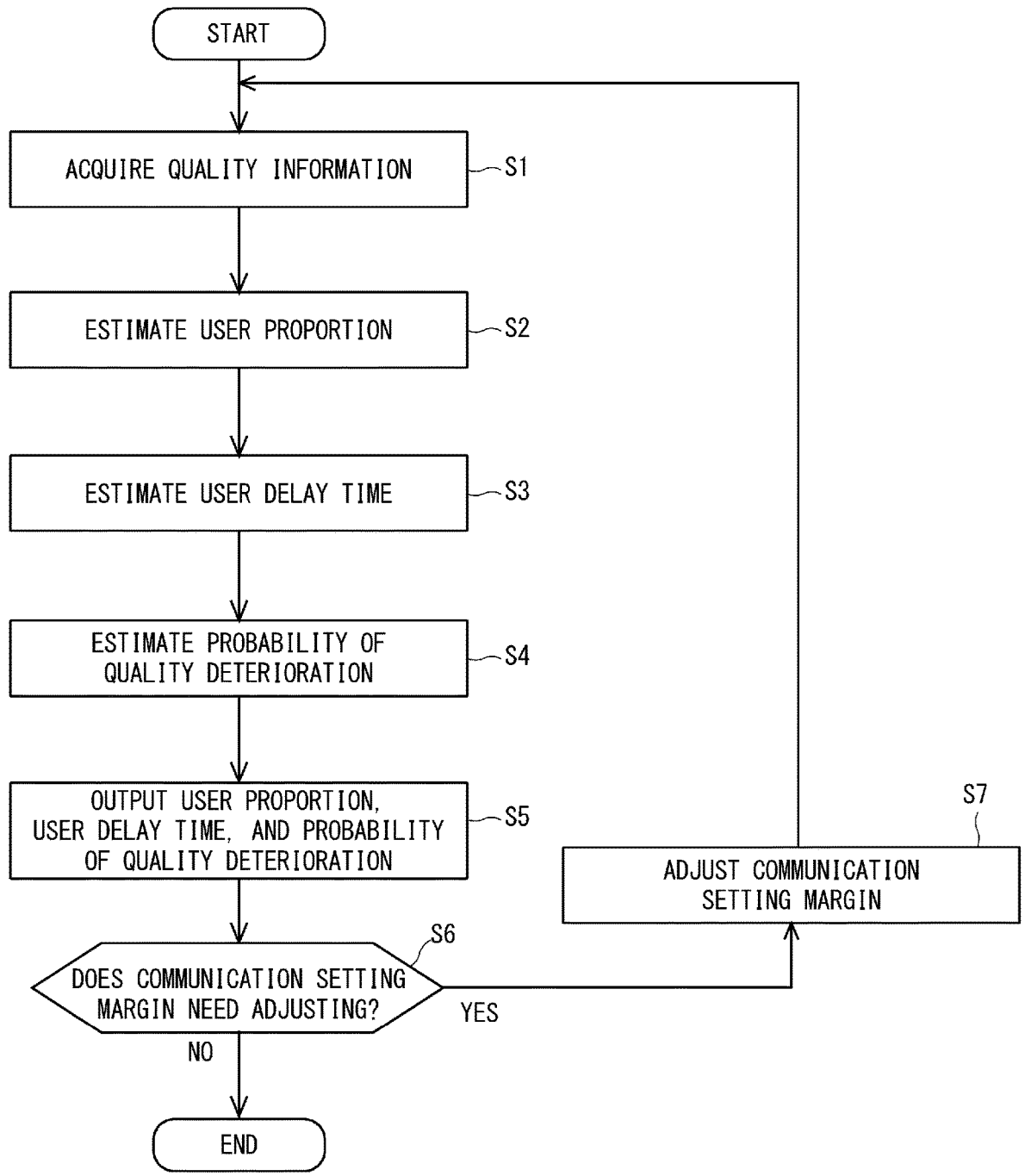
FIG. 7 is a flowchart illustrating an example of an operation of an optical transmission device according to the first example embodiment.

Next, with reference to FIG. 7, an example of an operation of the optical transmission device 20 according to the first example embodiment will be described. FIG. 7 is a flowchart illustrating an example of an operation of the optical transmission device according to the first example embodiment. The example of the operation illustrated in FIG. 7 is executed upon the start of the optical transmission device 20. In addition, the example of the operation illustrated in FIG. 7 is executed when a communication service provider has made a change to a communication setting. Herein, the example of the operation illustrated in FIG. 7 may be executed periodically or non-periodically.

The acquiring unit 22 acquires quality information concerning a burst error that has occurred in communication in the optical communication line 16 (step S1). The acquiring unit 22 acquires RTT indicating a communication round-trip time between the optical transmission devices 20 and 30 connected to the optical communication line 16, a burst error time in which a burst error has occurred, and BER indicating an error rate in the optical communication line 16. The acquiring unit 22 may further acquire the number of users who communicate via the optical communication line 16 and SNR in the optical communication line 16.

The estimating unit 23 estimates the user proportion indicating the proportion of the number of users for whom communication quality deteriorates with respect to the number of users who communicate via the optical communication line 16, based on the RTT and the burst error time acquired by the acquiring unit 22 (step S2). The estimating unit 23 estimates the user proportion based on the RTT and the burst error time by use of the equation (1).

The estimating unit 23 estimates a user delay time based on the RTT and the BER acquired by the acquiring unit 22 (step S3). The estimating unit 23 estimates the delay time in the terminal device 10 based on the RTT and the BER by use of the equation (2).

The estimating unit 23 estimates the probability of quality deterioration indicating the probability of failing to satisfy the delay quality index value based on the RTT, the BER, and the delay quality index value acquired by the acquiring unit 22 (step S4). The estimating unit 23 estimates the probability of quality deterioration based on the RTT, the BER, and the delay quality index value by use of the equation (3).

The output unit 25 outputs the user proportion, the user delay time, and the probability of quality deterioration estimated at steps S2 to S5 (step S5).

The controlling unit 24 determines whether a communication setting margin needs adjusting (step S6). The controlling unit 24 calculates the user communication speed $B_{TCP}$, the communication speed $B_{MOD}$ in the multi-level modulation scheme, and the error rate $P_{MOD}$ in the multi-level modulation scheme by use of the equations (4) to (8). The controlling unit 24 determines whether the communication setting margin needs adjusting by determining whether $B_{EST}$ is smaller than $B_{MOD}$ and whether at least one of the burst error time or $P_{MOD}$ is smaller than, for example, a target threshold. Herein, the controlling unit 24 may determine whether the user proportion exceeds its target threshold A'.

If the communication setting margin needs adjusting (YES at step S6), the controlling unit 24 adjusts the communication setting margin (step S7). If $B_{EST}$ is smaller than $B_{MOD}$, the controlling unit 24 determines a new multi-value level $M_{i+1}$, by lowering the multi-value level to lower than the current multi-value level $M_i$. Meanwhile, if at least one of the burst error time or $P_{MOD}$ is smaller than, for example, a target threshold, the controlling unit 24 determines a new multi-value level $M_{i+1}$, by raising the multi-value level to higher than the current multi-value level $M_i$. The controlling unit 24 selects, from among modulation schemes that can be used in communication in the optical communication line 16, a modulation scheme corresponding to the determined multi-value level $M_{i+1}$, and changes the modulation scheme to the selected modulation scheme. The controlling unit 24 adjusts the communication setting margin by changing the modulation scheme.

Herein, if the user proportion has exceeded A', the controlling unit 24 may change the modulation scheme to a modulation scheme corresponding to a multi-value level that is smaller than the current multi-value level by one. Meanwhile, if the user proportion is a sufficiently small value, such as 0.1, for example, the controlling unit 24 may change the modulation scheme to a modulation scheme corresponding to a multi-value level that is greater than the current multi-value level by one.

The controlling unit 24 changes the communication setting so that the burst error time does not exceed the RTT. The controlling unit 24 performs control so that the burst error time does not exceed the RTT by selecting an FEC setting with a short interleave.

Meanwhile, if the communication setting margin does not need adjusting at step S6, (NO at step S6), the optical transmission device 20 terminates the process.

As described above, the optical transmission device 20 estimates an index value indicating the degree of influence of a burst error on communication quality based on quality information concerning the burst error. Specifically, the optical transmission device 20 estimates the user proportion, the user delay time, and the probability of quality deterioration based on the quality information. Accordingly, the optical transmission device 20 according to the first example embodiment makes it possible to estimate the user proportion, the user delay time, and the probability of quality deterioration, which enables a communication service provider to grasp the condition of communication quality.

Furthermore, since the use of the optical transmission device 20 according to the first example embodiment makes it possible to grasp the degree of influence on users, a communication service provider can change a communication setting with the degree of influence on users taken into consideration. Accordingly, the optical transmission device 20 according to the first example embodiment makes it possible to control the communication setting flexibly by, for example, increasing communication capacity with the degree of influence on users taken into consideration.

The controlling unit 24 adjusts a communication setting margin by use of the user proportion. Specifically, the controlling unit 24 changes the modulation scheme by use of the user proportion. The controlling unit 24 enables high-speed communication by changing the modulation scheme. Accordingly, the optical transmission device 20 according to the first example embodiment makes it possible to provide users with a high-speed communication service.

Furthermore, the optical transmission devices 20 and 30 communicate by use of an ultra-high-speed TCP scheme having higher error resistance than a typical TCP scheme. As described above, the optical transmission device 20, by use of the ultra-high-speed TCP scheme, can increase communication capacity while retaining high user throughput. Moreover, the controlling unit 24 performs control so that a burst error time does not exceed RTT and keeps the throughput and communication capacity from decreasing by preventing retransmission triggered by RTO. Accordingly, the optical transmission device 20 according to the first example embodiment makes it possible to increase communication capacity while retaining high user throughput.

Second Example Embodiment

Next, a second example embodiment will be described. According to the second example embodiment, the process performed by the optical transmission device 20 according to the first example embodiment is performed by a network monitoring device.

<Example of Configuration of Optical Communication System>

Figure 8:
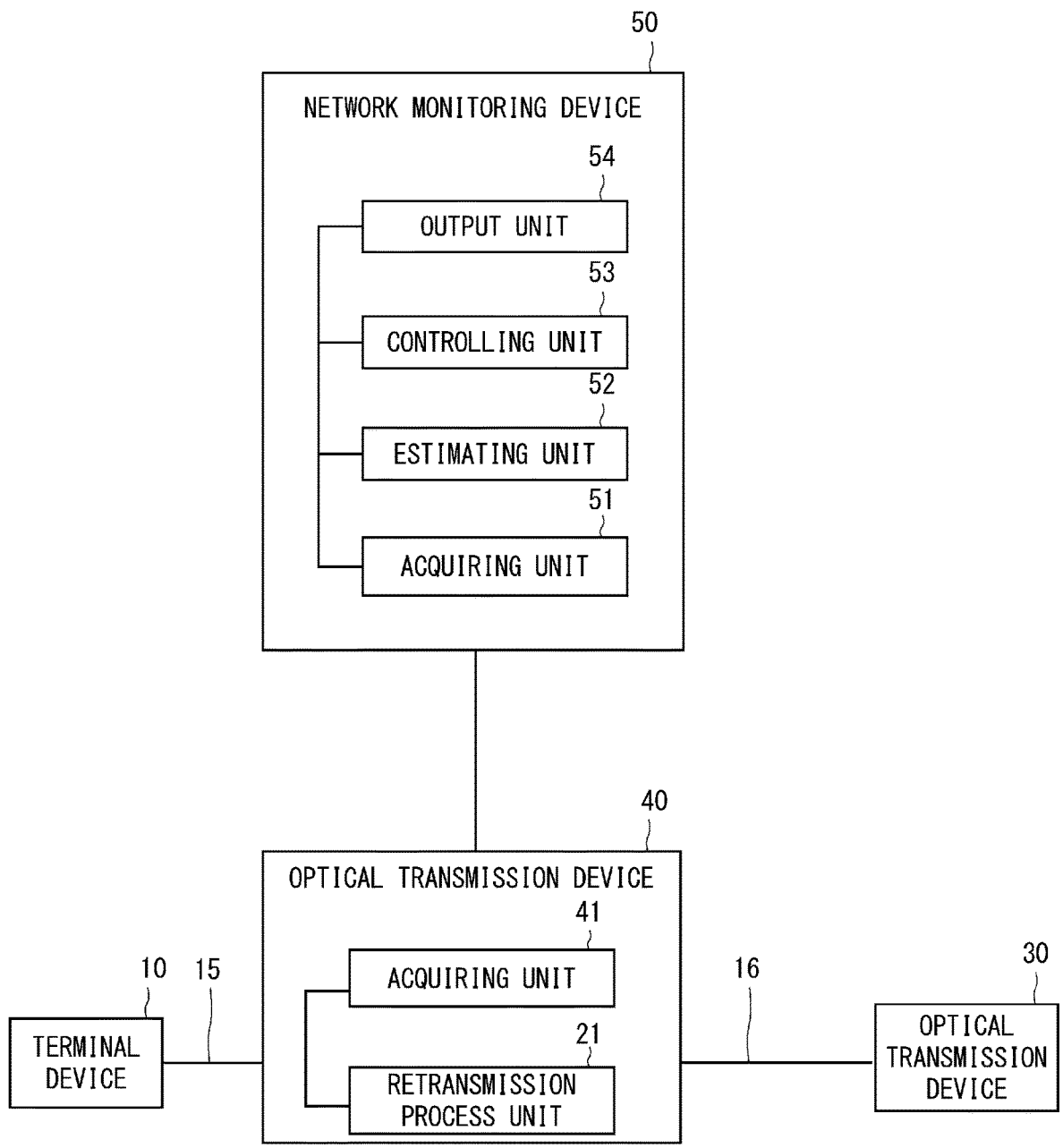
FIG. 8 illustrates an example of a configuration of an optical communication system according to a second example embodiment.

With reference to FIG. 8, an example of a configuration of an optical communication system 200 according to the second example embodiment will be described. FIG. 8 illustrates an example of a configuration of an optical communication system according to the second example embodiment. The optical communication system 200 includes a terminal device 10, optical transmission devices 30 and 40, and a network monitoring device 50.

The optical communication system 200 includes the network monitoring device 50 in addition to the components of the optical communication system 100 according to the first example embodiment. Moreover, in the configuration of the optical communication system 200, the optical transmission device 20 in the optical communication system 100 according to the first example embodiment is replaced by the optical transmission device 40. The configuration of the terminal device 10 and the optical transmission device 30 is basically similar to their respective counterparts according to the first example embodiment, and thus description thereof will be omitted, as appropriate.

The network monitoring device 50 is a device that monitors the entire network in the optical communication system 200. The network monitoring device 50 may be referred to as a network management system (NMS). The network monitoring device 50 is connected to the optical transmission device 20 and communicates with the optical transmission device 40 via a network. The network monitoring device 50 monitors the optical transmission device 20 and performs control via the optical transmission device 20. Although not illustrated in FIG. 8, the network monitoring device 50 is connected to the optical transmission device 30 as well via a network and configured to be capable of monitoring the optical transmission device 30 and performing control via the optical transmission device 30.

<Example of Configuration of Optical Transmission Device>

Next, an example of a configuration of the optical transmission device 40 will be described. The optical transmission device 40 corresponds to the optical transmission device 20 according to the first example embodiment. The optical transmission device 40 includes a retransmission process unit 21 and an acquiring unit 41. The retransmission process unit 21 has a configuration similar to the configuration of the retransmission process unit 21 according to the first example embodiment, and thus description thereof will be omitted.

The acquiring unit 41 has a configuration basically similar to the configuration of the acquiring unit 22 according to the first example embodiment. The acquiring unit 41 acquires quality information concerning a burst error that occurs in communication in an optical communication line 16. The acquiring unit 41 acquires RTT indicating a communication round-trip time between the optical transmission devices 40 and 30 connected to the optical communication line 16, a burst error time of a burst error, and BER indicating an error rate in the optical communication line 16. The acquiring unit 41 may further acquire the number of users who communicate via the optical communication line 16 and SNR in the optical communication line 16. The acquiring unit 41 transmits the acquired RTT, burst error time, and BER to the network monitoring device 50.

<Example of Configuration of Network Monitoring Device>

Next, an example of a configuration of the network monitoring device 50 will be described. The network monitoring device 50 includes an acquiring unit 51, an estimating unit 52, a controlling unit 53, and an output unit 54.

The acquiring unit 51 acquires RTT, a burst error time, and BER by receiving the RTT, the burst error time, and the BER acquired by the acquiring unit 41.

The estimating unit 52 corresponds to the estimating unit 23 according to the first example embodiment. The estimating unit 52 has a configuration similar to the configuration of the estimating unit 23 according to the first example embodiment and executes the process performed by the estimating unit 23 according to the first example embodiment.

The controlling unit 53 corresponds to the controlling unit 24 according to the first example embodiment. The controlling unit 53 has a configuration similar to the configuration of the controlling unit 24 according to the first example embodiment. The controlling unit 53 determines whether a communication setting margin needs adjusting based on the user proportion. In response to determining that a communication setting margin needs adjusting, the controlling unit 53 determines the contents of adjustment to be made to the communication setting margin.

Specifically, the controlling unit 53 determines the modulation scheme of communication in the optical communication line 16 in accordance with the user proportion estimated by the estimating unit 52. The controlling unit 53 determines an interleave length in FEC so that a burst error time does not exceed RTT. The controlling unit 53 transmits the determined modulation scheme and interleave length to the optical transmission device 40 and causes the optical transmission device 40 to change the modulation scheme and the interleave length.

The output unit 54 corresponds to the output unit 25 according to the first example embodiment. The output unit 54 has a configuration similar to the configuration of the output unit 25 according to the first example embodiment and executes the process performed by the output unit 25 according to the first example embodiment.

<Example of Operation of Network Monitoring Device>

Next, an example of an operation of the network monitoring device will be described. The operation of the network monitoring device 50 is basically similar to the example of the operation of the optical transmission device 20 according to the first example embodiment and will thus be described with omissions, as appropriate, with reference to FIG. 7. The network monitoring device 50 executes the example of the operation illustrated in FIG. 7 upon the start of the optical transmission device 20. In addition, the network monitoring device 50 executes the example of the operation illustrated in FIG. 7 when a communication service provider has made a change to a communication setting. Herein, the network monitoring device 50 may start the process at a desired timing while the optical transmission device 40 is starting.

The acquiring unit 51 acquires, from the optical transmission device 40, RTT indicating a communication round-trip time between the optical transmission devices 40 and 30 connected to the optical communication line 16, a burst error time in which a burst error has occurred, and BER indicating an error rate in the optical communication line 16 (step S1). The acquiring unit 51 acquires the RTT, the burst error time, and the BER by receiving the RTT, the burst error time, and the BER from the optical transmission device 40.

At step S7, the controlling unit 53 adjusts the communication setting margin (step S7). When $B_{EST}$ is smaller than $B_{MOD}$, the controlling unit 53 determines a new multi-value level $M_{i+1}$, by lowering the multi-value level to lower than the current multi-value level $M_i$. Meanwhile, when at least one of the burst error time or $P_{MOD}$ is smaller than, for example, a target threshold, the controlling unit 53 determines a new multi-value level $M_{i+1}$, by raising the multi-value level to higher than the current multi-value level $M_i$. The controlling unit 53 selects, from among modulation schemes that can be used in communication in the optical communication line 16, a modulation scheme corresponding to the determined multi-value level $M_{i+1}$. The controlling unit 53 transmits the selected modulation scheme to the optical transmission device 40 and causes the optical transmission device 40 to execute control of changing the modulation scheme to the selected modulation scheme.

The controlling unit 53 determines an interleave length in FEC so that the burst error time does not exceed the RTT. The controlling unit 53 transmits the interleave length to the optical transmission device 40 and causes the optical transmission device 40 to execute control of changing the interleave length to the determined interleave length.

In this manner, even when the network monitoring device 50 executes the process that is executed by the optical transmission device 20 according to the first example embodiment, advantageous effects similar to those according to the first example embodiment can be obtained.

Other Example Embodiments

<1> According to the foregoing example embodiments, the optical transmission devices 20 and 40 each include a retransmission process unit 21. Alternatively, for example, a relay device (not illustrated) between the optical transmission device 20 or 40 and the terminal device 10 may include a retransmission process unit 21. Even with this configuration, advantageous effects similar to those according to the foregoing example embodiments can be obtained.

Figure 9:
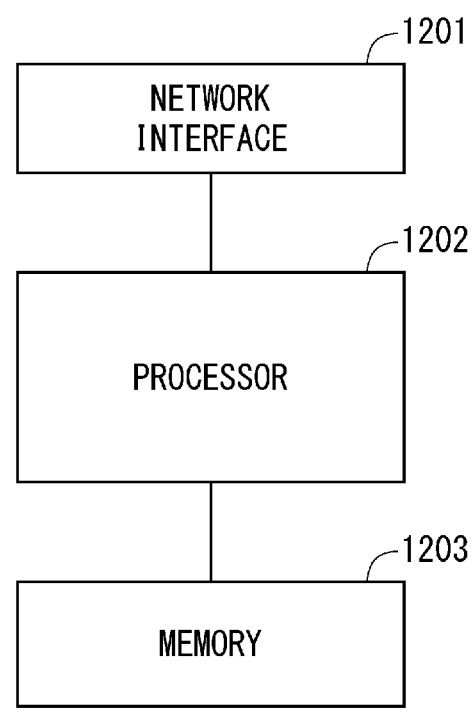
FIG. 9 illustrates an example of a hardware configuration of a communication device and others according to some example embodiments.

<2> FIG. 9 illustrates an example of a hardware configuration of the communication device 1, the optical transmission devices 20 and 40, and the network monitoring device 50 (these devices are referred to below as the communication device 1 and others) described according to the foregoing example embodiments. With reference to FIG. 9, the communication device 1 and others each include a network interface 1201, a processor 1202, and a memory 1203. The network interface 1201 is used to communicate with another communication device included in an optical communication system, such as an optical transmission device, a terminal device, or a network monitoring device.

The processor 1202 reads out software (computer program) from the memory 1203 and executes the software. Thus, the processor 1202 performs the processes of the communication device 1 and others described with reference to the flowchart according to the foregoing example embodiments. The processor 1202 may be, for example, a microprocessor, a microprocessing unit (MPU), a central processing unit (CPU). The processor 1202 may include a plurality of processors.

The memory 1203 includes a combination of a volatile memory and a non-volatile memory. The memory 1203 may include a storage provided apart from the processor 1202. In this case, the processor 1202 may access the memory 1203 via an I/O interface (not illustrated).

In the example illustrated in FIG. 9, the memory 1203 is used to store a set of software modules. The processor 1202 reads out the set of software modules from the memory 1203 and executes the set of software modules. Thus, the processor 1202 can perform the processes of the communication device 1 and others described according to the foregoing example embodiments.

As described with reference to FIG. 9, each of the processors included in the communication device 1 and others executes one or more programs including a set of instructions for causing a computer to execute algorithms described with reference to the drawings.

In the foregoing examples, a program can be stored and provided to a computer by use of various types of non-transitory computer-readable media. Non-transitory computer-readable media include various types of tangible storage media. Examples of such non-transitory computer-readable media include a magnetic recording medium (e.g., flexible disk, magnetic tape, hard-disk drive), a magneto-optical recording medium (e.g., magneto-optical disk). Additional examples of non-transitory computer-readable media include a CD-ROM (read-only memory), a CD-R, and a CD-R/W. Yet additional examples of non-transitory computer-readable media include a semiconductor memory. Examples of semiconductor memories include a mask ROM, a programmable ROM (PROM), an erasable PROM (EPROM), a flash ROM, or a random-access memory (RAM). A program may be supplied to a computer also by use of various types of transitory computer-readable media. Examples of such transitory computer-readable media include an electric signal, an optical signal, and an electromagnetic wave. A transitory computer-readable medium can supply a program to a computer via a wired communication line, such as an electric wire or an optical fiber, or via a wireless communication line.

It is to be noted that the present disclosure is not limited to the foregoing example embodiments, and modifications can be made as appropriate within the scope that does not depart from the technical spirit. The present disclosure may be implemented by combining the example embodiments as appropriate.

A part or the whole of the foregoing example embodiments can also be expressed as in the following supplementary notes, which are not limiting.

(Supplementary Note 1)
A communication device comprising:
acquiring means configured to acquire quality information concerning a burst error that has occurred in an optical communication line; and
estimating means configured to estimate a first index value based on the quality information, the first index value indicating a degree of influence of the burst error on communication quality in a first communication device.

(Supplementary Note 2)
The communication device according to Supplementary Note 1, wherein
the first index value includes a user proportion indicating a proportion of the number of users for whom the communication quality deteriorates with respect to the number of users who communicate via the optical communication line,
the quality information includes a communication round-trip time between a first optical transmission device and a second optical transmission device each connected to the optical communication line and a burst error time in which the burst error has occurred, and
the estimating means is configured to estimate the user proportion based on the communication round-trip time and the burst error time.

(Supplementary Note 3)
The communication device according to Supplementary Note 2, further comprising controlling means configured to change a communication setting in the optical communication line based on the estimated user proportion.

(Supplementary Note 4)
The communication device according to Supplementary Note 3, wherein the controlling means is configured to change a modulation scheme in the communication in accordance with the estimated user proportion.

(Supplementary Note 5)
The communication device according to Supplementary Note 4, wherein
the acquiring means is configured to acquire the number of users who communicate via the optical communication line and an optical signal quality in the optical communication line, and
the controlling means is configured to change the modulation scheme in the communication based further on the number of users and the optical signal quality.

(Supplementary Note 6)
The communication device according to any one of Supplementary Notes 3 to 5, wherein the controlling means is configured to change an interleave length in an error correction process so that the burst error time does not exceed the communication round-trip time.

(Supplementary Note 7)
The communication device according to any one of Supplementary Notes 1 to 6, wherein
the first index value includes a delay time in the first communication device,
the quality information includes a communication round-trip time between a first optical transmission device and a second optical transmission device each connected to the optical communication line and an error rate in the optical communication line, and
the estimating means is configured to estimate the delay time based on the communication round-trip time and the error rate.

(Supplementary Note 8)
The communication device according to Supplementary Note 7, wherein
the first index value includes a probability of failing to satisfy a second index value pertaining to a delay time required for communication in the optical communication line, and
the estimating means is configured to estimate the probability based on the communication round-trip time, the error rate, and the second index value.

(Supplementary Note 9)
The communication device according to any one of Supplementary Notes 1 to 8, further comprising retransmission process means configured to execute a retransmission process if an error has occurred in communication in the optical communication line.

(Supplementary Note 10)
The communication device according to Supplementary Note 9, wherein the retransmission process means is configured to perform the communication by use of a TCP scheme having higher error resistance than a TCP Reno scheme.

(Supplementary Note 11)
A communication controlling method comprising:
acquiring quality information concerning a burst error that has occurred in an optical communication line; and
estimating a first index value based on the quality information, the first index value indicating a degree of influence of the burst error on communication quality in a first communication device.

(Supplementary Note 12)
A non-transitory computer-readable medium storing a communication controlling program that causes a computer to execute:
acquiring quality information concerning a burst error that has occurred in an optical communication line; and
estimating a first index value based on the quality information, the first index value indicating a degree of influence of the burst error on communication quality in a first communication device.

REFERENCE SIGNS LIST

1 COMMUNICATION DEVICE
2, 22, 51 ACQUIRING UNIT
3, 23, 52 ESTIMATING UNIT
10 TERMINAL DEVICE
15 CIRCUIT
16 OPTICAL COMMUNICATION LINE
20, 30, 40 OPTICAL TRANSMISSION DEVICE
21 RETRANSMISSION PROCESS UNIT
24, 53 CONTROLLING UNIT
25, 54 OUTPUT UNIT
41 ACQUIRING UNIT
50 NETWORK MONITORING DEVICE
100, 200 OPTICAL COMMUNICATION SYSTEM

What is claimed is:

1. A communication device comprising:
at least one memory storing instructions; and
at least one processor configured to execute the instructions stored in the memory to:
acquire quality information concerning a burst error that has occurred in an optical communication line; and
estimate a first index value based on the quality information, the first index value indicating a degree of influence of the burst error on communication quality in a first communication device,
wherein the first index value includes a user proportion indicating a proportion of the number of users for whom the communication quality deteriorates with respect to the number of users who communicate via the optical communication line.

2. The communication device according to claim 1, wherein
the quality information includes a communication round-trip time between a first optical transmission device and a second optical transmission device each connected to the optical communication line and a burst error time in which the burst error has occurred, and
the processor is configured to execute the instructions to estimate the user proportion based on the communication round-trip time and the burst error time.

3. The communication device according to claim 2, wherein the processor is further configured to execute the instructions to change a communication setting in the optical communication line based on the estimated user proportion.

4. The communication device according to claim 3, wherein the processor is configured to execute the instructions to change a modulation scheme in the communication in accordance with the estimated user proportion.

5. The communication device according to claim 4, wherein the processor is configured to execute the instructions to:
acquire the number of users who communicate via the optical communication line and an optical signal quality in the optical communication line, and
change the modulation scheme in the communication based further on the number of users and the optical signal quality.

6. The communication device according to claim 3, wherein the processor is configured to execute the instructions to change an interleave length in an error correction process so that the burst error time does not exceed the communication round-trip time.

7. The communication device according to claim 1, wherein
the first index value includes a delay time in the first communication device,
the quality information includes a communication round-trip time between a first optical transmission device and a second optical transmission device each connected to the optical communication line and an error rate in the optical communication line, and
the processor is configured to execute the instructions to estimate the delay time based on the communication round-trip time and the error rate.

8. The communication device according to claim 7, wherein
the first index value includes a probability of failing to satisfy a second index value pertaining to a delay time required for communication in the optical communication line, and
the processor is configured to execute the instructions to estimate the probability based on the communication round-trip time, the error rate, and the second index value.

9. The communication device according to claim 1, wherein the processor is further configured to execute the instructions to execute a retransmission process if an error has occurred in communication in the optical communication line.

10. The communication device according to claim 9, wherein the processor is configured to execute the instructions to perform the communication by use of a TCP scheme having higher error resistance than a TCP Reno scheme.

11. A communication controlling method comprising:
acquiring quality information concerning a burst error that has occurred in an optical communication line; and
estimating a first index value based on the quality information, the first index value indicating a degree of influence of the burst error on communication quality in a first communication device,
wherein the first index value includes a user proportion indicating a proportion of the number of users for whom the communication quality deteriorates with respect to the number of users who communicate via the optical communication line.

12. A non-transitory computer-readable medium storing a communication controlling program that causes a computer to execute:
acquiring quality information concerning a burst error that has occurred in an optical communication line; and
estimating a first index value based on the quality information, the first index value indicating a degree of influence of the burst error on communication quality in a first communication device,
wherein the first index value includes a user proportion indicating a proportion of the number of users for whom the communication quality deteriorates with respect to the number of users who communicate via the optical communication line.

* * * * *